S. D. TRACY.
Revolving Harrow.
No. 26,630.
Patented Dec. 27, 1859.
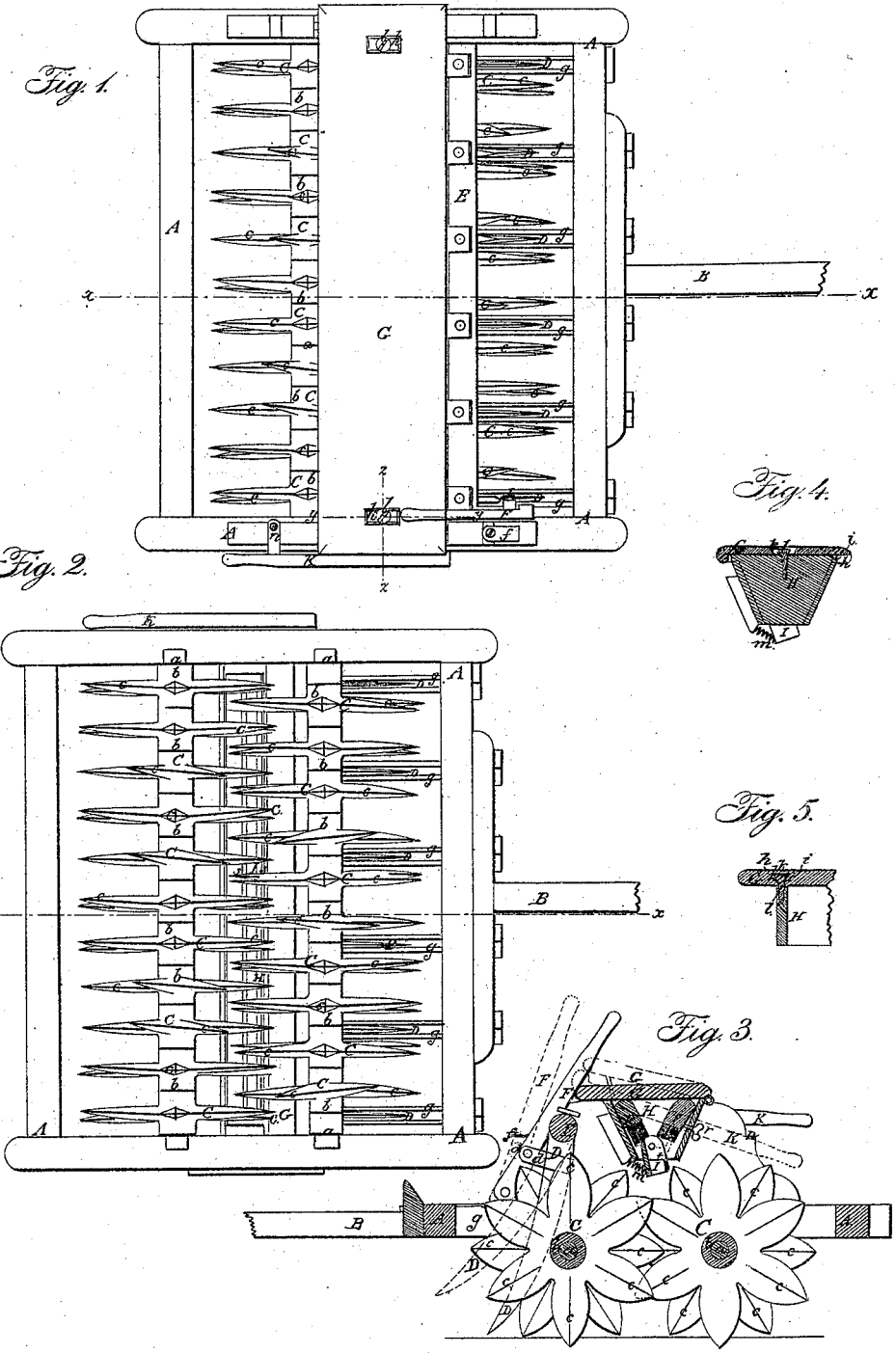
Witnesses:
Inventor:

UNITED STATES PATENT OFFICE.

SAMUEL D. TRACY, OF VERNON CENTRE, NEW YORK.

IMPROVEMENT IN SEEDING-CULTIVATORS.

Specification forming part of Letters Patent No. 26,630, dated December 27, 1859.

*To all whom it may concern:*

Be it known that I, SAMUEL D. TRACY, of Vernon Centre, in the county of Oneida and State of New York, have invented a new and Improved Pulverizer and Broadcast Seed-Sower; and I do hereby declare that the following is a full and exact description thereof, reference being had to the accompanying drawings, making part of this specification—

Figure 1 being a plan of the machine; Fig. 2, a plan of the under side thereof; Fig. 3, a longitudinal vertical section thereof in the plane indicated by the line $x\ x$, Figs. 1 and 2; Fig. 4, a section of a part detached, the plane of section being indicated by the line $y\ y$, Fig. 1; Fig. 5, a section of a part detached, the plane of section being indicated by the line $z\ z$, Fig. 1.

Like letters designate corresponding parts in all the figures.

The working parts of the machine are mounted in a rectangular frame, A, to the front of which is secured a shaft or tongue, B, for drawing the machine. The ground is pulverized and the seed covered by means of sets of knife or spur wheels C C, arranged side by side, and turning freely on axes $a\ a$. These spur-wheels are formed with hubs $b\ b$, of sufficient length to give them steadiness of motion and keep them at proper distances apart. The radial blades or spurs $c\ c$ of each wheel are so set that each alternate blade or spur inclines on one side and each intermediate blade or spur inclines on the opposite side of the central plane of the wheel's motion, as shown in Figs. 1 and 2. Thus the action of the blades or spurs $c\ c$ as they revolve, being turned out of a vertical plane, is such as to pulverize the soil to a much wider extent on each side and much more thoroughly than if they were arranged all in one plane.

A set of movable cutters, D D, is used in connection with the front set of spur-wheels, being secured at the top to a rock-shaft, E, as shown most clearly in Figs. 1 and 3. A lever or handle, F, is connected with the rock-shaft E or with one of the cutters D D by a pivoted connecting-bar, $d$, or its equivalent, so that by moving the handle forward the cutters will be thrown forward and raised away from the ground, as shown by the red lines in Fig. 3. The handle may be held in this position by a catch or button, $f$, situated behind it, or in any other convenient manner. The cutters are embraced in slotted supports $g\ g$, which are situated about midway of the length of the cutters, and against the rear ends of which the said cutters bear when they are lowered to the ground. The edges of the cutters are sharp, so as to cut large clods or turfs that would otherwise obstruct the action of the machine. When the cutters are lowered they are constantly kept cleared of sods and other obstructions by the spur-wheels, and, on the other hand, they serve to clear the spur-wheels of obstructions at all times.

The seed-box is secured to the under side of a hinged seat, G, for the driver's use, in a position above and about midway between the two sets of spur-wheels C C, so that the rear set of the latter serves to cover the seeds. Transversely in the under side of each end of the seat G is made a dovetail groove, $h$, or its equivalent, Figs. 4 and 5, in which fits a corresponding tongue, $i$, of the seed-box H. Slots $k\ k$, of sufficient length to allow any necessary amount of adjustment forward or backward of the seed-box, are made respectively in each end of the seat G, covering the tongues $i\ i$ of the seed-box, and through these slots pass tightening-screws $l\ l$, whereby the seed-box may be secured in any desirable position for varying the depth to which the seeds are buried by the spur-wheels, according as they fall farther forward or backward beneath said wheels. By taking out the screws $l\ l$ the seed-box can be removed from the machine when desired. In order to regulate the supply of seed from the seed-box, parallel brushes $p\ p$ are located therein, extending the whole length thereof, substantially as represented in Fig. 3. One of these brushes is adjustable toward and from the other brush by means of a thumb-screw, $r$, or its equivalent. Thus the supply of seed may be increased or diminished, as desired.

In the bottom of the seed-box H, and below the brushes $p\ p$, is located a vibratory seed-distributer, I, Fig. 3, being hinged at each end thereof. This consists of a long spout formed of two nearly parallel sides or lips, $s\ s$, so arranged in connection with the bottom $t$ of the seed-box that when held back by springs $m\ m$ the outlet for the seeds is closed; but by pushing the distributer forward the outlet is opened and allows the seeds to fall through. The forward vibrations of the distributer may be produced by the ends of the blades or spurs of the rear set of spur-wheels striking against it in quick succession, the spring $m\,m$ as quickly returning the vibrations. This rapid vibratory motion of the seed-distributer thus produced gives a flirting motion to the seed backward and forward as it is discharged, thereby spreading it evenly on the ground.

The seat G can be raised, and with it the seed-box H, when the machine is in operation by means of a lever or handle, K, pivoted to the side of the frame under the seat, and this handle may be held down by a button, $u$, above it, or in any convenient manner.

What I claim as my invention, and desire to secure by Letters Patent, is—

1. Giving the zigzag or alternate opposite inclinations to the blades of the spur-wheels C C, in the manner and for the purpose herein set forth.

2. The combination of the movable or adjustable cutters D D and their slotted supports $g\,g$ with the zigzag spur-wheels C C, in the manner and for the purposes herein specified.

3. The arrangement of the seed-box H in grooves in the under side of the hinged seat G, so as to be adjustable beneath it, removable therefrom, or turned up therewith, substantially as herein described.

4. The vibrating seed-distributer I, constructed, operated, and operating substantially as and for the purpose herein specified.

In witness that the above is a true specification of my improved pulverizer and broadcast-sower I hereunto set my hand this 18th day of July, 1859.

SAMUEL D. TRACY.

Witnesses:
S. TOWNSLY,
C. PARDEE.